(No Model.)
J. P. LAVIGNE.
MICROMETER GAGE.
No. 508,952. Patented Nov. 21, 1893.
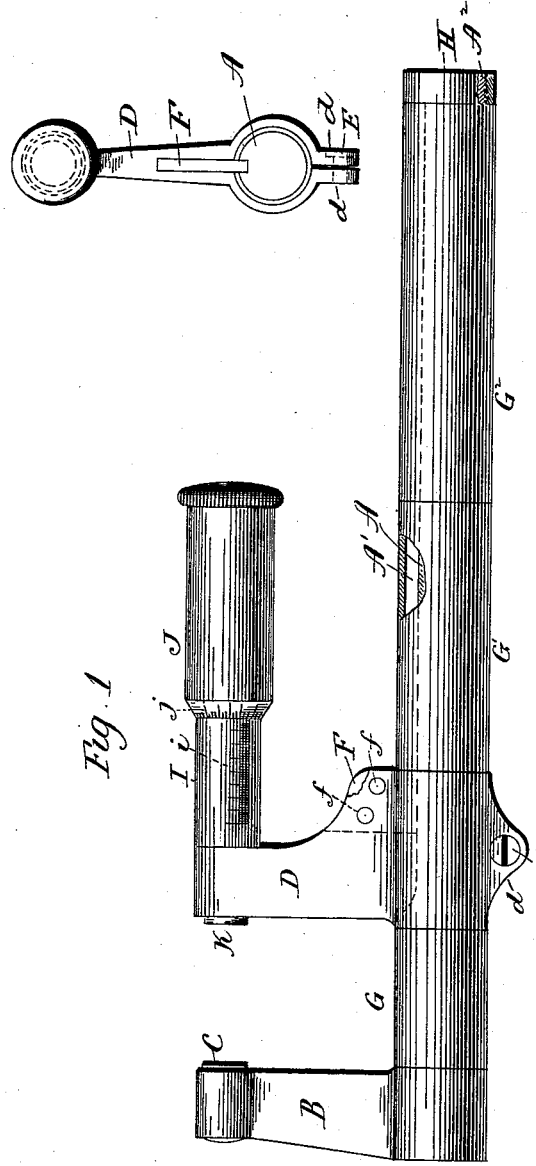

UNITED STATES PATENT OFFICE.

JOSEPH P. LAVIGNE, OF NEW HAVEN, CONNECTICUT.

MICROMETER-GAGE.

SPECIFICATION forming part of Letters Patent No. 508,952, dated November 21, 1893.

Application filed January 7, 1893. Serial No. 457,607. (No model.)

*To all whom it may concern:*

Be it known that I, JOSEPH P. LAVIGNE, of New Haven, in the county of New Haven and State of Connecticut, have invented a new Improvement in Micrometer-Gages; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a micrometer gage constructed in accordance with my invention; Fig. 2, a detached end view of the movable jaw.

My invention relates to an improvement in that class of micrometer gages in which the measuring of inches is done by a set of movable pieces differentiated in length by inches, and adapted to be interchanged with each other, and in which the measuring of fractions of inches is done by a measuring-screw, the object being to produce a simple, convenient and durable instrument having its movable pieces applied to the outside of its beam.

With these ends in view my invention consists in a micrometer gage having a movable jaw and a fixed jaw, means for measuring fractions of inches, and a series of measuring sleeves differentiated in length by inches, and adapted to be interchanged with each other to determine the position of the movable jaw with respect to the fixed jaw.

My invention further consists in certain details of construction and combinations of parts as will be hereinafter described and particularly recited in the claims.

As herein shown, my improved device has a long beam A, circular in cross section, and furnished at one end with a fixed jaw B, extending at a right angle to it, and provided at its outer end with an anvil C, of any approved construction. A movable jaw D, is mounted upon the beam, and constructed to be moved back and forth thereon, its lower end being split to clasp the same, and furnished with lugs $d\ d$, which receive a clamping-screw E, by means of which the jaw is fixed in any of its adjustments. The said jaw is positively locked against rotation on the beam by means of a peg or block F, secured in its bifurcated lower end by pivots $f\ f$, and extending into a longitudinal groove A' formed in the upper face of the beam. A series of measuring sleeves G, G' and $G^2$, differentiated in length by inches, are adapted to fit over the beam upon which they are secured by a threaded collar H, applied to the threaded outer end $A^2$, thereof. These sleeves are interchanged with each other according to the separation which it is desired to secure between the jaws B and D. Thus, if it is desired that said jaws shall be maintained one inch apart, the sleeve G, is interposed between them, as shown in the drawings, while the sleeves G' and $G^2$ are interposed between the outer edge of the movable jaw and the collar H. The order of the sleeves G' and $G^2$ is of course immaterial. On the other hand, if it should be desired to maintain the separation of three inches between the fixed and movable jaws, the sleeve $G^2$, would be interposed between them and the sleeves G, and G' arranged between the outer edge of the movable jaw and the collar H. These sleeves provide for the measurement of inches.

For the measurement of fractions of inches, I provide the movable jaw with means therefor of any approved construction. As an illustration of such means, I have herein shown the outer end of the said jaw to be provided with a fixed sleeve I, provided with graduations I', a rotary sleeve J, mounted upon the sleeve I, and having its beveled inner edge furnished with graduations J' and with a measuring screw K, located within the said sleeves, and controlled in operation by the sleeve J. I do not, however, limit myself to this particular mechanism for measuring the fractions of inches. I do not describe it more in detail because its construction is too well known to those skilled in this art.

I would have it understood that I do not limit myself to the exact construction herein shown and described, but hold myself at liberty to make such changes and alterations therein as fairly fall within the spirit and scope of my invention.

Having fully described my invention, what I claim as new, and desire to secure by Letters Patent, is—

1. In a micrometer having a beam and a movable jaw applied thereto and a fixed jaw, means for measuring fractions of inches, and a series of measuring sleeves adapted to fit over the said beam differentiated in length by inches, and designed to be interchanged with each other to determine the position of the beam of the movable jaw with respect to the fixed jaw, substantially as described.

2. A micrometer gage having a beam furnished at one end with a fixed jaw, a movable jaw mounted upon the said beam, means for measuring fractions of inches carried by the said movable jaw, and a series of sleeves adapted to fit over the said beam, differentiated in length by inches, and designed to be interchanged with each other to determine the separation of the movable jaw from the fixed jaw, substantially as described.

3. A micrometer gage having a beam circular in cross section, and constructed with a longitudinal groove, a fixed jaw located at one end of the said beam, a movable jaw mounted upon the beam and provided with a key which enters the said slot to prevent it from rotating thereupon, a series of sleeves adapted to be mounted upon the beam, differentiated in inches, and designed to be interchanged with each other to determine the separation of the two jaws, means for holding the sleeves upon the beam, and means for measuring the fractions of inches carried by the movable jaw, substantially as described.

In testimony whereof I have signed this specification in the presence of two subscribing witnesses.

JOSEPH P. LAVIGNE.

Witnesses:
FRED C. EARLE,
GEORGE D. SEYMOUR.